US012238086B2

(12) United States Patent
Abraham et al.

(10) Patent No.: US 12,238,086 B2
(45) Date of Patent: Feb. 25, 2025

(54) SYSTEMS AND METHODS FOR PREVENTING TOLL FRAUD IN A SIP ENVIRONMENT

(71) Applicant: Avaya Management L.P., Durham, NC (US)

(72) Inventors: Jinson Abraham, Stittsville (CA); Hrishikesh Ulhas Mahajan, Pune (IN)

(73) Assignee: Avaya Management L.P., Durham, NC (US)

( * ) Notice: Subject to any disclaimer, the term of this patent is extended or adjusted under 35 U.S.C. 154(b) by 329 days.

(21) Appl. No.: 17/843,759

(22) Filed: Jun. 17, 2022

(65) Prior Publication Data

US 2023/0412584 A1 Dec. 21, 2023

(51) Int. Cl.
*H04L 9/40* (2022.01)
(52) U.S. Cl.
CPC ........ *H04L 63/0823* (2013.01); *H04L 63/083* (2013.01); *H04L 63/0876* (2013.01)
(58) Field of Classification Search
CPC ............... H04L 63/0823; H04L 63/083; H04L 63/0876
See application file for complete search history.

(56) References Cited

U.S. PATENT DOCUMENTS

| | | | | |
|---|---|---|---|---|
| 8,705,743 B2* | 4/2014 | Howard | ................. | H04L 63/104 380/255 |
| 8,954,733 B2* | 2/2015 | Akehurst | ............ | H04L 63/0823 713/158 |
| 9,015,473 B2* | 4/2015 | Costa | ...................... | H04L 63/10 713/156 |
| 9,742,742 B1* | 8/2017 | Monk | .................... | H04L 9/3263 |
| 9,825,937 B2* | 11/2017 | Ahmavaara | ......... | H04W 12/041 |
| 10,115,082 B1* | 10/2018 | Wilson | ............. | G06K 19/06112 |
| 11,936,796 B1* | 3/2024 | Allen | ..................... | H04L 9/3263 |
| 2015/0032863 A1* | 1/2015 | Sinha | .................. | H04L 65/1104 709/220 |
| 2016/0099919 A1* | 4/2016 | Daniels | ................. | H04L 67/141 713/155 |
| 2016/0241397 A1* | 8/2016 | Adam | ................... | H04L 9/0894 |

(Continued)

OTHER PUBLICATIONS

Cooper et al. "Internet X.509 Public Key Infrastructure Certificate and Certificate Revocation List (CRL) Profile," IETF, Network Working Group, May 2008, 151 pages.

(Continued)

*Primary Examiner* — Gary S Gracia
(74) *Attorney, Agent, or Firm* — Sheridan Ross P.C.

(57) ABSTRACT

A method includes storing user information including tying information and a password, wherein the tying information includes a communication address and a device identifier that ties the communication address to a communication device. The method also includes receiving the communication address and password encrypted using a digital certificate associated with the communication device with the digital certificate including the tying information. The method further includes determining that the tying information of the digital certificate matches the stored tying information and determining the encrypted password matches the stored password. The method further includes authenticating the user information for the communication device.

20 Claims, 7 Drawing Sheets

(56) References Cited

U.S. PATENT DOCUMENTS

| | | | | |
|---|---|---|---|---|
| 2016/0241558 A1* | 8/2016 | Adam | ............... | H04L 63/0823 |
| 2017/0366537 A1* | 12/2017 | Bose | ............... | H04L 63/0823 |
| 2018/0234408 A1* | 8/2018 | Bransom | ............... | H04L 9/3297 |
| 2019/0073671 A1* | 3/2019 | Fang | ............... | G06Q 20/40 |
| 2020/0259815 A1* | 8/2020 | Caceres | ............... | G06F 21/45 |
| 2020/0342545 A1* | 10/2020 | Dobson | ............... | G16H 40/20 |
| 2021/0203656 A1* | 7/2021 | Fowler | ............... | H04L 63/0823 |
| 2021/0281562 A1* | 9/2021 | Schwarz | ............... | G06F 21/335 |
| 2021/0297410 A1* | 9/2021 | Zhou | ............... | H04W 12/06 |
| 2022/0100832 A1* | 3/2022 | Rennich | ............... | H04L 9/3231 |
| 2023/0308294 A1* | 9/2023 | Aoshima | ............... | H04L 9/3263 |
| 2023/0342160 A1* | 10/2023 | Gajulapally | ............... | G06F 9/445 |
| 2023/0410223 A1* | 12/2023 | Dobson | ............... | G16H 15/00 |
| 2023/0412584 A1* | 12/2023 | Abraham | ............... | H04L 63/0876 |
| 2024/0311025 A1* | 9/2024 | Rao | ............... | G06F 3/0611 |

OTHER PUBLICATIONS

Rosenberg et al. "SIP: Session Initiation Protocol," The Internet Society, Network Working Group, Jun. 2002, RFC 3261, 269 pages.

\* cited by examiner

SYSTEMS AND METHODS FOR PREVENTING TOLL FRAUD IN A SIP ENVIRONMENT

FIELD OF THE DISCLOSURE

The present disclosure relates generally to systems and methods for controlling communication devices and particularly to systems and methods for preventing toll fraud in a Session Initiation Protocol (SIP) environment.

BACKGROUND

Currently, several communication systems exist that allow a user to login to multiple Session Initiation Protocol (SIP) communication devices or endpoints (e.g., with a server, etc.) simultaneously registered with the same extension. This technology is known as multiple-device access (MDA). As of today, there is no good way of preventing an unauthorized user from using the extension of an authorized user when the password of the authorized user has been compromised. This unauthorized action is typically performed on a communication device or communication endpoint not normally used by or associated with the authorized user. Moreover, this unauthorized action can result in toll fraud if the authorized user's extension is still valid for making calls. For example, User A may be assigned (e.g., authorized to use) an extension with the extension number 1234. If User A's password is compromised, an unauthorized or malicious User X, who obtains User A's SIP phone credentials (i.e., extension number 1234 and password) can login using User A's extension from any communication device or communication endpoint, and this will allow User X to make outbound calls or even receive calls that were intended for User A.

Since network-based systems typically include signature-based systems, these systems rely on an electronic signature, such as a digital certificate and/or key, to provide a trusted relationship between entities using the signature-based system. Currently, for user authentication in a SIP environment, password-based authentication is only used. With the password-based authentication system, if a user enters the correct communication address (e.g., the extension number) and password, authorization is granted. Therefore, when a SIP server (e.g., a session manager) receives a request for authentication of a password associated with an extension number from a communication device, even when the communication device presents a digital certificate to the SIP server, the SIP server only checks to see if the digital certificate is trusted. Nothing else is checked with respect to the communication device being associated with the extension number. Thus, there is no association between the communication address (e.g., the extension number) and the communication device. This is because current digital certificates issued to a communication device may include a device identifier (e.g., a Media Access Control (MAC) address) identifying the communication device but the SIP server, used for authorization, does not include the device identifier in its database for comparison. Moreover, current digital certificates do not include a communication address associated with the device identifier, although the communication address is provided in the database of the SIP server.

Therefore, if the certificate presented by the communication device is trusted by the SIP server, then a user can login if the correct communication address (e.g., the extension number) and password are entered even if a malicious user enters this information from a different communication device than the communication device of the authorized user. Therefore, from the example above, both User A and User X can authenticate User A's password associated with User A's extension number using any communication device. Once User A's password and extension number have been correctly entered, the SIP server will process the extension number and password for authentication. Once authenticated, either user (e.g., User A or User X) is logged in using any communication device. This unauthorized use creates the toll fraud issue discussed above.

Therefore, there is a need for preventing toll fraud in a SIP environment by not only associating a communication address (e.g., an extension) to a password, but also tying the communication address (e.g., an extension number, a username, a SIP handle, etc.) to a communication device by way of a device identifier (e.g., an Internet Protocol (IP) address, a MAC address, etc.).

SUMMARY

These and other needs are addressed by the various embodiments and configurations of the present disclosure. The present disclosure can provide a number of advantages depending on the particular configuration. These and other advantages will be apparent from the disclosure contained herein.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system". Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such as a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or arts and the equivalents thereof shall include all those described in the summary, brief description of the drawings, detailed description, abstract, and claims themselves.

The preceding is a simplified summary of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

Figure 1:
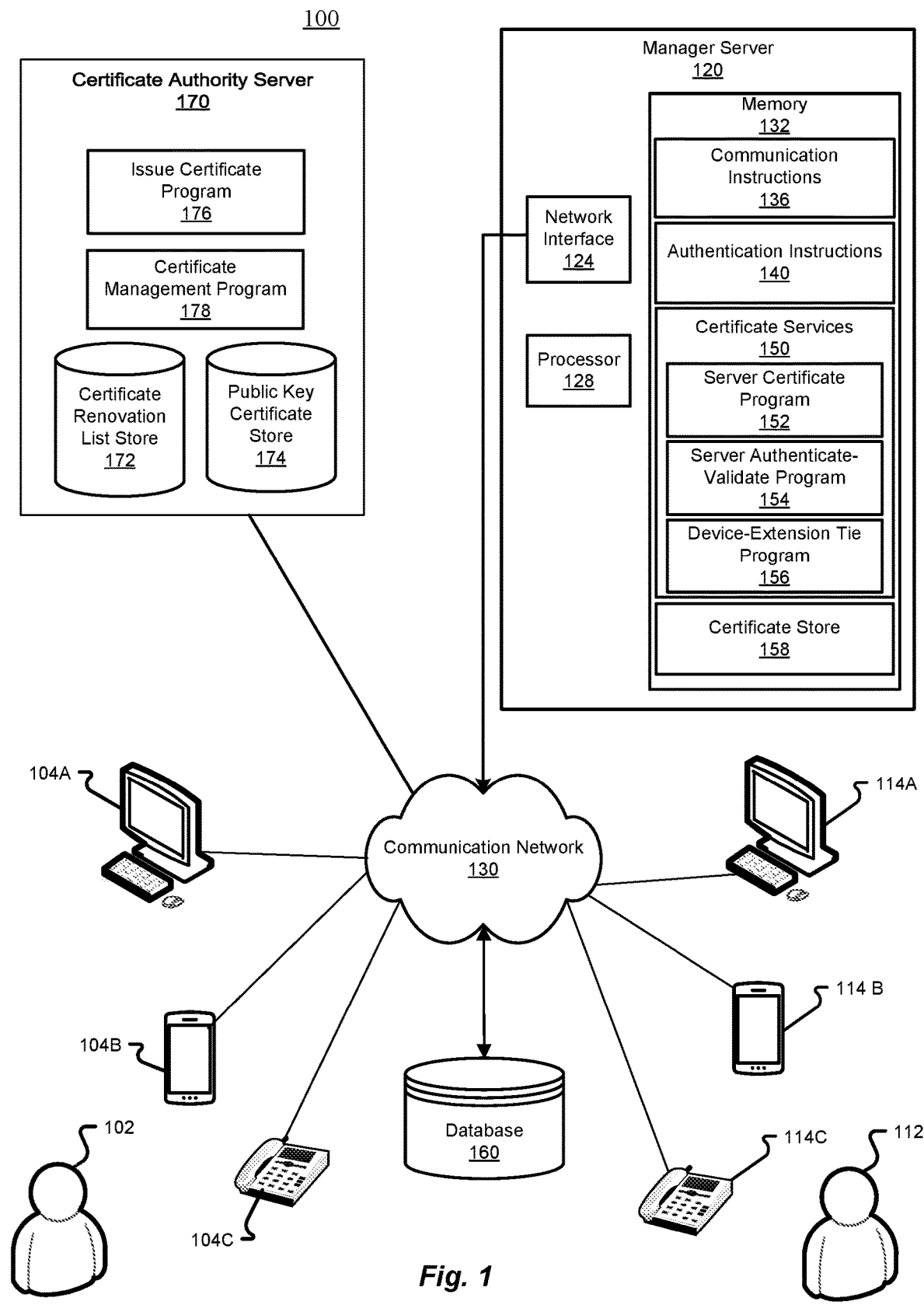
FIG. 1 depicts a block diagram of a communication system in accordance with embodiments of the present disclosure.

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only, and is not intended to limit the scope, applicability, or configuration of the claims. Furthermore, to avoid unnecessary obscuring the present disclosure, the preceding description omits a number of known structures and devices. This omission is not to be construed as a limitation of the scope of the claims. Rather, the ensuing description of the exemplary embodiments will provide those skilled in the art with an enabling description for implementing the exemplary embodiments. It should however be understood and appreciated that various changes may be made in the function and arrangement of elements without departing from the spirit and scope of the appended claims.

Any reference in the description comprising an element number, without a sub element identifier when a sub element identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

The term "Session Initiation Protocol" (SIP) as used herein refers to an Internet Engineering Task Force (IETF)—defined signaling protocol, widely used for controlling multimedia communication sessions such as voice and video calls over Internet Protocol (IP). The protocol can be used for creating, modifying and terminating two-party (unicast) or multiparty (multicast) sessions consisting of one or several media streams. The modification can involve changing addresses or ports, inviting more participants, and adding or deleting media streams. Other feasible application examples include video conferencing, streaming multimedia distribution, instant messaging, presence information, file transfer and online games. SIP is as described in RFC 3261, available from the IETF Network Working Group, November 2000; this document and all other SIP Realtime Transport Protocol (RFC)'s describing SIP are hereby incorporated by reference in their entirety for all that they teach.

The terms "extension" and/or "communication channel," and variations thereof may be used interchangeably herein and may refer to a communications transmission channel that is associated with a user and that provides a dedicated channel for communications made to or from the user. The extension may correspond to a unique number associated with a user and that can be logged into (e.g., registered, etc.) via one or more communication devices to enable communications over the extension. As provided herein, a user may register multiple communication devices (e.g., in a multiple-device access environment, etc.) with the extension such that each of the registered communication devices can use the same communication channel to send and receive communications, messages, and/or protocol signals, etc. According to embodiments of the present disclosure, one or more users may have one or more extensions registered to the user.

The term "communication address" as used herein refers to information or an address that uniquely belongs to a user for communication. The communication address is entered into the communication device and includes, but is not limited to, an extension number, a username, a SIP handle, etc. The term "device identifier" as used herein refers to information used to identify the communication device such as, but not limited to, a Media Access Control (MAC) address, an IP address, etc.

FIG. 1 is a block diagram of an illustrative communication system 100 shown in accordance with embodiments of the present disclosure. The communication system 100 utilizes a public key infrastructure (PKI), in accordance with one embodiment of the present disclosure. A public key infrastructure environment enables users of an unsecured network, for example the Internet, to exchange secure messages and conduct secure transactions by using a public and private cryptographic key pair. A public key can be created and distributed by a certificate authority and is typically included within a digital certificate. A digital certificate, also referred to here as a certificate, contains identifying and authenticating information which may be referred to as attributes of the certificate, as discussed further in FIG. 2. The public key attribute of a certificate is used for identification and for encryption and decryption of messages, enabling secure exchange and transactions across unsecured networks.

The communication system 100 of FIG. 1 may be a distributed system that includes components used in the public key infrastructure environment and, in some embodiments, includes a communication network 130 connecting one or more communication devices 104A-104C and 114A-114C with a manager server 120 and a certificate authority server 170. Additionally, FIG. 1 illustrates two storage devices of the certificate authority server 170, the certificate revocation list store 172 and the public key certificate store 174, which can be used by the certificate authority server 170 for posting of certificate revocation lists and storing public key certificates for public access, respectively. Although represented separately, in one embodiment of the present disclosure, the certificate revocation list store 172 and the public key certificate store 174 can be combined onto a single storage device or database, or in various other forms, combinations or distributions of storage. In one embodiment of the present disclosure, the certificate revocation list store 172 and the public key certificate store 174 can be included within services and resources provided by the certificate authority server 170, or in another embodiment of the present disclosure, the storage can be provided by a delegate of the certificate authority server 170, or a third-party (not illustrated), and accessed through the communication network 130. The certificate authority server 170 assumes an important role in identity authentication of public key certificates associated with network users.

Also included in FIG. 1 is the illustration of the certificate management program 178, provided within the certificate authority server 170 which supports multiple functions associated with digital certificates, including some of which support the life cycle of digital certificates. A digital certificate can be revoked by the certificate authority server 170 for several reasons. For example, a certificate can be revoked for failure to pay a renewal fee, if the secrecy of the private key is compromised, or other reasons that require users to be aware that the certificate should not be trusted. In one embodiment of the present disclosure, the certificate authority server 170 uses the certificate management program 178, to create and publish listings of revoked certificates. These lists can be transmitted and stored onto storage devices supporting certificate authorities, as illustrated by the certificate revocation list store 172, in FIG. 1.

In other embodiments of the present disclosure, the certificate revocation lists may be distributed to other network storage devices, or the revocation status may be obtained by using an Online Certificate Status Protocol (OCSP) as an alternative to accessing certificate revocation lists. The revocation status may be obtained by other means by making the revocation status of a digital certificate available to network-connected computing devices. In one embodiment of the present disclosure, the certificate authority server 170 uses the certificate management program 178 to send the digital certificate created with the issue certificate program 176 to the public key certificate store 174. By placing the public key digital certificate in the public key certificate store 174, the certificate authority server 170 has distributed the public key to make it generally available. In other embodiments, the public key certificate may be distributed to other publicly available storage devices or by the owner (e.g., the subject of the digital certificate), as appropriate. In general, public key certificates are made publicly available to users that require the public key certificate for authenticating connections and securing transactions with the certificate subject, the holder of the private key counterpart of the public key certificate.

According to one embodiment of the present disclosure, the manager server 120 may be a SIP session manager server. The communication system 100 may include, but is not limited to, a first communication device 104A, a second communication device 104B, and a third communication device 104C registered with a common extension associated with a user 102 via the manager server 120. The communication system 100 may also include a first communication device 114A, a second communication device 114B, and a third communication device 114C registered with a common extension associated with a user 112 via the manager server 120. The manager server 120 communicates with a database 160. As discussed in greater detail below, each of the communication devices 104A-104C and 114A-114C includes public key certificates for other communication devices as well as public key certificates for the certificate authority server 170.

The manager server 120 may provide collaborative communication sessions, conference meetings, multi-party calls, SIP functionality, and/or other audio/video communication services. In some embodiments, the manager server 120 allows the multiple communication devices 104A-104C to be registered with the same extension simultaneously (e.g., providing selective access to the communication channel associated with the user 102 from each registered communication device 104A-104C, etc.) and the manager server 120 also allows the multiple communication devices 114A-114C to be registered with the same extension simultaneously (e.g., providing selective access to the communication channel associated with a user 112 from each registered communication device 114A-114C, etc.). Accordingly, the communication system 100 shown in FIG. 1 may be referred to herein as a multiple-device access (MDA) environment. According to an alternative embodiment of the present disclosure, multiple communication devices 104A-104C may be registered with one or more different extensions associated with user 102 and multiple communication devices 114A-114C may be registered with one or more different extensions associated with user 112.

As illustrated in FIG. 1, the user 102 may be able to access the functionality provided by the manager server 120 via one or more registered communication devices 104A-104C. In particular, each communication device 104A-104C may be registered with the manager server 120 using an extension that is associated with the user 102. The extension that is associated with the user 102 may be the same number, or communication channel, for each of the communication devices 104A-104C registered by the user 102. Each of the communication devices 104A-104C may be associated with a particular geographical location and/or location type.

In accordance with embodiments of the present disclosure, the communication network 130 may include any type of known communication medium or collection of communication media and may use any type of protocols to transport messages between endpoints. The communication network 130 may include wired and/or wireless communication technologies. The Internet is an example of the communication network 130 that constitutes an IP network consisting of many computers, computing networks, and other communication devices located all over the world, which are connected through many telephone systems and other means. Other examples of the communication network 130 include, without limitation, a standard Plain Old Telephone System ("POTS"), an Integrated Services Digital Network ("ISDN"), the Public Switched Telephone Network ("PSTN"), a Local Area Network ("LAN"), a Wide Area Network ("WAN"), a Voice over IP ("VoIP") network, a SIP network, a cellular network, and any other type of packet-switched or circuit-switched network known in the art. In addition, it can be appreciated that the communication network 130 need not be limited to any one network type, and instead may include a number of different networks and/or network types. The communication network 130 may include a number of different communication media such as coaxial cable, copper cable/wire, fiber-optic cable, antennas for transmitting/receiving wireless messages, and combinations thereof.

In some embodiments of the present disclosure, at least one of the communication devices 104A-104C/114A-114C may correspond to a computing device, a personal communication device, a portable communication device, a laptop, a smartphone, a tablet, a personal computer, and/or any other device capable of running an operating system ("OS"), at least one voice application, a web browser, a SIP application, and/or the like. The SIP application may be configured to exchange communications between a respective communication device 104A-104C/114A-114C and the manager server 120. For instance, the communication devices 104A-104C/114A-114C may be configured to operate various versions of Microsoft Corp.'s Windows® and/or Apple Corp.'s Macintosh® operating systems, any of a variety of commercially-available UNIX® such as LINUX or other UNIX-like operating systems, iOS, Android®, etc. These communication devices 104A-104C/114A-114C, may also have any of a variety of applications, including for example, web browser applications, chat applications, video applications, social media applications, calling applications, email applications, calendar applications, clock applications, SIP applications, etc., and/or combinations thereof. In some embodiments of the present disclosure, the communication devices 104A-104C/114A-114C may alternatively or additionally be any other electronic device, such as an Internet-enabled mobile telephone and/or a personal digital assistant, capable of communicating via the communication network 130.

Additionally, or alternatively, communications may be sent and/or received via a respective communication device 104A-104C/114A-114C as a telephone call, a packet or collection of packets (e.g., IP packets transmitted over an IP network), an email message, an instant message ("IM"), a short message service ("SMS") message, a multimedia messaging service ("MMS") message, a chat, and/or combinations thereof. In some embodiments, the communication devices 104A-104C/114A-114C may communicate over an audio and/or a video channel over the communication network 130.

The manager server 120 may include hardware and/or software resources that, among other things, provide the ability for MDA where two or more of the communication devices 104A-104C/114A-114C are registered simultaneously with an extension of a user 102/112. Among other things, the manager server 120 may provide SIP functionality to allow the communication devices 104A-104C/114A-114C to hold multi-party calls, conference calls, and/or other collaborative communications over a same communication channel, or extension, that is associated with a user 102/112. The manager server 120 may include a network interface 124, a processor 128, and a memory 132. The manager server 120 may also include communication instructions 136, authentication instructions 140, certificate services 150 including server certificate program 152, server authenticate-validate program 154 and device-extension tying program 156, certificate store 158 and/or the like.

The network interface 124 provides the manager server 120 with the ability to send and receive communication packets or the like over the communication network 130. The network interface 124 may be provided as a network interface card ("NIC"), a network port, a modem, drivers for the same, and the like. Communications between the components of the manager server 120 and other devices connected to the communication network 130 may flow through the network interface 124 of the manager server 120. In some embodiments, examples of a suitable network interface 124 include, without limitation, an antenna, a driver circuit, an Ethernet port, a modulator/demodulator, an NIC, an RJ-11 port, an RJ-45 port, an RS-232 port, a USB port, etc. The network interface 124 may include one or multiple different network interfaces depending upon whether the manager server 120 is connecting to a single communication network or multiple different types of communication networks. For instance, the manager server 120 may be provided with both a wired network interface and a wireless network interface without departing from the scope of the present disclosure. In some embodiments of the present disclosure, the network interface 124 may include different communication ports that interconnect with various input/output lines.

In some embodiments of the present disclosure, the processor 128 may correspond to one or more computer processing devices. For example, the processor 128 may be provided as silicon, an Application-Specific Integrated Circuit ("ASIC"), as a Field Programmable Gate Array ("FPGA"), any other type of Integrated Circuit ("IC") chip, a collection of IC chips, and/or the like. In some embodiments of the present disclosure, the processor 128 may be provided as a Central Processing Unit ("CPU"), a microprocessor, or a plurality of microprocessors that are configured to execute the instruction sets stored in the memory 132. Upon executing the instruction sets stored in the memory 132, the processor 128 enables various communications, registrations, authentications and/or interaction functions of the manager server 120 and provides communications over one or more extensions for one or more registered communication devices (e.g., communication devices 104A-104C/114A-114C, etc.) over the communication network 130.

The memory 132, or storage memory, may correspond to any type of non-transitory computer-readable medium. In some embodiments of the present disclosure, the memory 132 may include volatile or non-volatile memory and a controller for the same. Non-limiting examples of the storage memory 132 that may be utilized in the manager server 120 may include Random Access Memory ("RAM"), Read Only Memory ("ROM"), buffer memory, flash memory, solid-state memory, or variants thereof. Any of these memory types may be considered non-transitory computer memory devices even though the data stored thereby can be changed one or more times. The memory 132 may be used to store information about registrations, extensions, users, authentications, and/or the like. In some embodiments of the present disclosure, the memory 132 may be configured to store rules and/or the instruction sets depicted in addition to temporarily storing data for the processor 128 to execute various types of routines or functions. Although not depicted, the memory 132 may include instructions that enable the processor 128 to store data into a database and retrieve information from the database 160. According to embodiments of the present disclosure, information retrieved from the database 160 may include registration data and/or authentication data. In some embodiments, the database 160 or data stored therein may be stored internal to the manager server 120 (e.g., within the memory 132 of the manager server 120 rather than in a separate database) or in a separate server.

The communication instructions 136, when executed by the processor 128, may provide the ability for at least one of the communication devices 104A-104C/114A-114C registered with an extension of a user 102/112 at the manager server 120 to conduct SIP messaging, hold or conduct communications, and/or otherwise send and receive messages via the extension. In accordance with embodiments of the present disclosure, the communication instructions 136 may include instructions that, when executed by the processor 128, enable a MDA environment for the communication devices 104A-104C/114A-114C in the communication system 100. Among other things, the communication instructions 136 may allow a user 102/112 to have multiple communication devices 104A-104C/114A-114C, or communication endpoints, simultaneously registered with an extension of the user 102/112. For example, a user 102/112 may receive and place calls via multiple communication devices 104A-104C/114A-114C and even move calls between communication devices 104A-104C/114A-114C that are registered with the extension of the user 102/112. In one embodiment of the present disclosure, this multiple-device access environment may be used by a single user 102/112 and is not intended to be used by multiple users sharing the various communication devices 104A-104C/114A-114C that are registered with the extension of the single user 102/112. According to embodiments of the present disclosure, the user 102/112 may have additional extensions registered with different communication devices.

Additionally, or alternatively, the communication instructions 136 may integrate all communication devices 104A-104C/114A-114C across the communication system 100 and may even use existing private branch exchange ("PBX") equipment, services, and/or infrastructure. The manager server 120 and the processor 128 executing the communication instructions 136 may enable SIP routing and integration. Examples of other functions performed via the communication instructions 136, when executed by the processor 128, include, but are in no way limited to, normalizing disparate networks, providing centralized routing of calls and management of user profiles, supporting converged voice and video bandwidth management, providing application sequencing capabilities, etc., and/or combinations thereof.

The authentication instructions 140, when executed by the processor 128, may provide the ability for the manager server 120 to authenticate a user based on an entered communication address (e.g., an extension number, a username, a SIP handle, etc.) and a password encrypted using a valid digital certificate associated with a corresponding communication device. According to embodiments of the present disclosure, a user's communication address and password are stored in a storage device such as the database 160 for example. As discussed in greater detail below in FIG. 3, the database 160 may include a system registry that includes user information correlating the user to a communication address, a password, and a communication device (e.g., by way of the device identifier).

Certificate services 150 is illustrated as a collection of some of the functional programs to manage certificates for the manager server 120. In one embodiment of the present disclosure, the manager server 120 accesses a server website by means of a browser program and the communication network 130 and uses the server certificate program 152 to request a public key certificate from the contacted server or communication device. In other embodiments of the present disclosure, the manager server 120 may use the server certificate program 152 to connect with the public key certificate store 174 to obtain the public key certificate of a server or communication device or in yet other embodiments, the manager server 120 may have obtained and previously stored a public key certificate of the server or communication device in the certificate store 158, which can be used by the manager server 120. In response to receiving the public key certificate of the communication device, the manager server 120 uses the server authenticate-validate program 154 to confirm the identity of the certificate owner.

In one embodiment of the present disclosure, the manager server 120 uses the server certificate program 152 to obtain the public key digital certificate of the certificate authority server 170, the issuer and signatory of the communication device public key certificate. Alternatively, the manager server 120 may have been pre-loaded with the public key certificate of the certificate authority server 170 if the certificate authority server 170 is well known and established. Therefore, in another embodiment of the present disclosure, the public key certificate for the certificate authority server 170 may be retrieved by the manager server 120 from a pre-loaded storage location within the storage memory of the manager server 120. The server authenticate-validate program 154 then uses the public key certificate of the certificate authority server 170 to authenticate the signature on the certificate of the communication device, confirming the identity of the communication device. If the signatures are determined to match, the communication device's public key certificate is authenticated. The manager server 120 uses the server certificate program 152 to store the public key certificates of the communication device and the certificate authority server 170 in the certificate store 158.

The illustration of the certificate authority server 170 in FIG. 1 includes block diagrams representing a subset of the computer program functions performed by the certificate authority server 170, as well as data repositories such as the certificate revocation list store 172 and the public key certificate store 174, in accordance with one embodiment of the present disclosure. The certificate authority server 170 can be a public or private organization and the certificate authority server 170 forms the basis of trust in authenticating the identity of users and devices and providers of online network services and transactions.

According to one embodiment of the present disclosure, the certificate authority server 170 is configured to execute programs representing multiple functions. The program names shown in FIG. 1 reflect a consolidation of functionality for example purposes, however, the programs may be known by other names or labels and may be used by or contained in browsers, operating systems or other computer programs, and may further be implemented as hardware or software, for example. The certificate authority server 170 may receive a request to create a public key digital certificate from an entity, for example an organization with a website that provides a service to its clients, or an online retailer that requires authentication of its server to customers, or a user of a client computer that requires a public key authenticated by the certificate authority server 170.

In one embodiment of the present disclosure, one of the primary functions of the certificate authority server 170 is to issue digital certificates, performed by the issue certificate program 176. After the certificate authority server 170 confirms the identity of a network entity, for example the communication device 104A, the issue certificate program 176 creates a digital certificate with attributes that include in part, the private key for the communication device 104A, the subject and the digital signature of the certificate authority server 170, which binds the identity of the communication device 104A to the public key, within the digital certificate. Once signed by the certificate authority server 170, the digital certificate cannot be changed and attempts of tampering render the certificate non-functional.

The programs illustrated in FIG. 1 are not intended to be all-inclusive of functions a certificate authority, such as the certificate authority server 170 for example, may perform, but rather intended to describe the functions the certificate authority server 170 may typically perform relative to digital certificates in a public key infrastructure environment, within the communication system 100, according to embodiments of the present disclosure presented herein.

Figure 2:
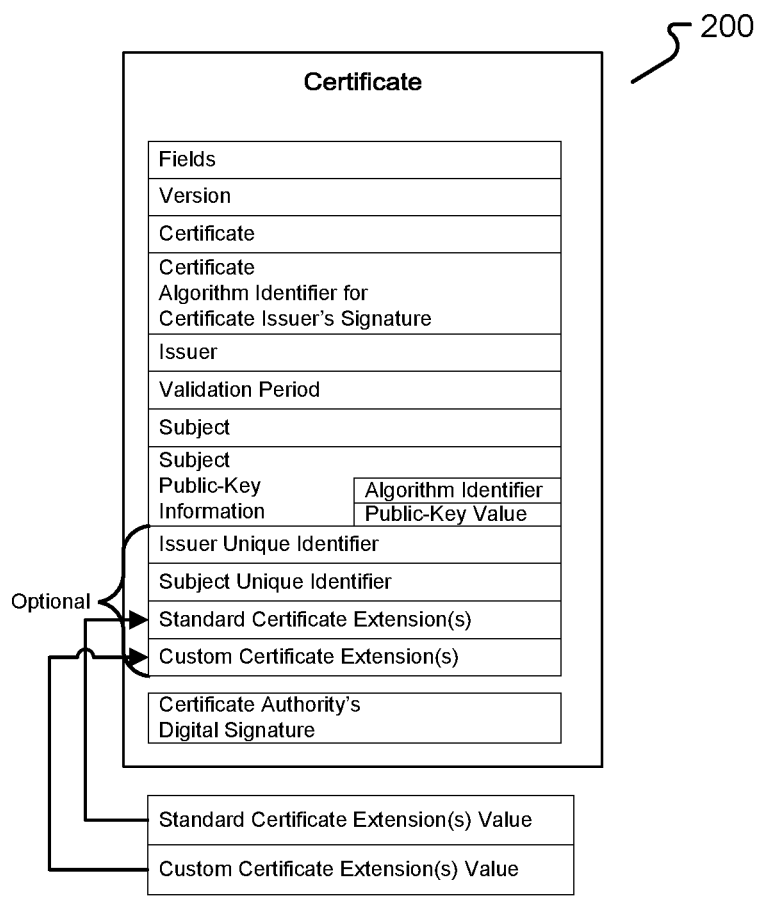
FIG. 2 is a block diagram illustrating features found within a digital certificate according to embodiments of the present disclosure.

Many public key certificates in use are based on the X.509 v3 digital certificate standard, a recommendation of certificate syntax and format of the International Telecommunications Union Telecommunications Standardization Sector (ITU-T). FIG. 2 is a block diagram illustrating features found within a digital certificate 200 according to embodiments of the present disclosure. As illustrated in FIG. 2, the digital certificate 200 includes several fields of information including, but not limited to, a version field, a certificate serial number field, a certificate algorithm identifier for certificate issuer's signature field, an issuer field, a validation period field, a subject field, a subject public-key information field including an algorithm identifier and a public-key value and a certificate authority's digital signature field. These fields contain identification attributes in the form of values. The digital certificate 200 also includes several optional fields including, but not limited to, an issuer unique identifier field, a subject unique identifier field, a standard certificate extension(s) field and a custom certificate extension(s) field. As illustrated in FIG. 2, an expanded view of values for some or all of the fields can also be included. For example, the expanded view of values for the standard certificate extension(s) field and the custom certificate extension(s) field is shown.

The standard certificate extension(s) contain attributes about the purpose of the digital certificate. Some standard certificate extensions include, but are not limited to, an authority key identifier extension, a subject key identifier extension, a key usage extension, a certificate policies extension, a policy mapping extension, a subject alternative name extension, an issuer alternative name extension, etc. Private internet certificate extension(s) may also be included. The private internet certificate extension(s) contain attributes which are used to direct applications to on-line information about the issuer or the subject may include, but are not limited to, an authority information access extension and a subject information access extension.

According to embodiments of the present disclosure as discussed in greater detail below, the custom certificate extension(s) contain attributes that tie a communication address to a communication device.

The subject field provides the name of the communication device (e.g., the computer user, network device or service) that the certificate authority issues the certificate. The subject name is commonly represented by using an X.500 or Lightweight Directory Access Protocol (LDAP) format. The subject field typically identifies the communication device, by the MAC address, although other device identifiers can be provided including an IP address.

According to embodiments of the present disclosure, in order to tie the communication device to a communication address, additional information must be included in the digital certificate during the request for the digital certificate. This tying information can either be added as an attribute or value to the subject field or added as an attribute or value to the custom certificate extension field. This tying information must also be added to the database where the registration and/or authentication information is stored. According to one embodiment of the present disclosure, this tying information can be added to the database 160 before applying for the digital certificate which includes the tying information. According to an alternative embodiment of the present disclosure, the tying information can be added to the database 160 after receiving the digital certificate which includes the tying information.

According to embodiments of the present disclosure, the subject field of the digital certificate now includes the communication address of a user of the communication device. The communication address may include an extension number, a username, a SIP handle, etc. According to an alternative embodiment of the present disclosure, if the subject field of the digital certificate does not include the communication address, the custom certificate extension(s) field may include the communication address. Therefore, a malicious user cannot make a call at a different communication device using the communication address and password combination fraudulently obtained.

The Table below includes other communication addresses that can be included as values for the subject field or as values in the custom certificate extension(s) field in order to tie the communication device to a communication address.

TABLE

| Communication Addresses | Explanation |
| --- | --- |
| Avaya SIP | This communication address indicates the handle supports the Avaya Session Initiation Protocol (SIP) based communications. |
| Avaya E.164 | This communication address indicates the handle refers to an E.164 formatted address. E.164 numbers are international numbers that can have a maximin of 13 digits and are usually written with the symbol (+) as a prefix. |
| Microsoft SIP | This communication address indicates the handle supports SIP-based communications. |
| Microsoft Exchange | This communication address indicates the handle is an email address and supports communication with Microsoft SMTP server(s). |
| Lotus Notes | This communication address indicates the handle is for Lotus Notes and the Domino calendar. |
| IBM Sametime | This communication address indicates the handle is for IBM Sametime. The address must be in the DN = IBM Handle format. |
| Avaya Presence/IM | This communication address indicates the handle is an address that is used for Extensible Messaging and Presence Protocol (XMPP) based Internet Messaging (IM) services and XMPP or SIP Presence services. In order to create a Presence communication profile, Avaya Presence/IM must be selected, and a communication address must be provided. |
| Google Talk | This communication address indicates the handle supports XMPP based communications with the Google Talk service. |
| Other email | This communication address indicates the handle is an email address other than the MS Exchange email address. |
| Other SIP | This communication address indicates the handle supports SIP based communications other than the listed ones. |
| Other XMPP | This communication address indicates the handle supports XMPP based communications other than those listed ones. |
| Work Assignment | This communication address indicates the handle supports accounts that can be assigned to an agent for the Work Assignment. |

According to embodiments of the present disclosure, the communication address(es) that the user includes as values in the subject field or as values in the custom certificate extension(s) field may be used for each of the registered communication devices of the user. Accordingly, the manager server not only trusts the digital certificate, but also retrieves tying information from the digital certificate and compares the tying information with the tying information stored in the database 160.

Figure 3:
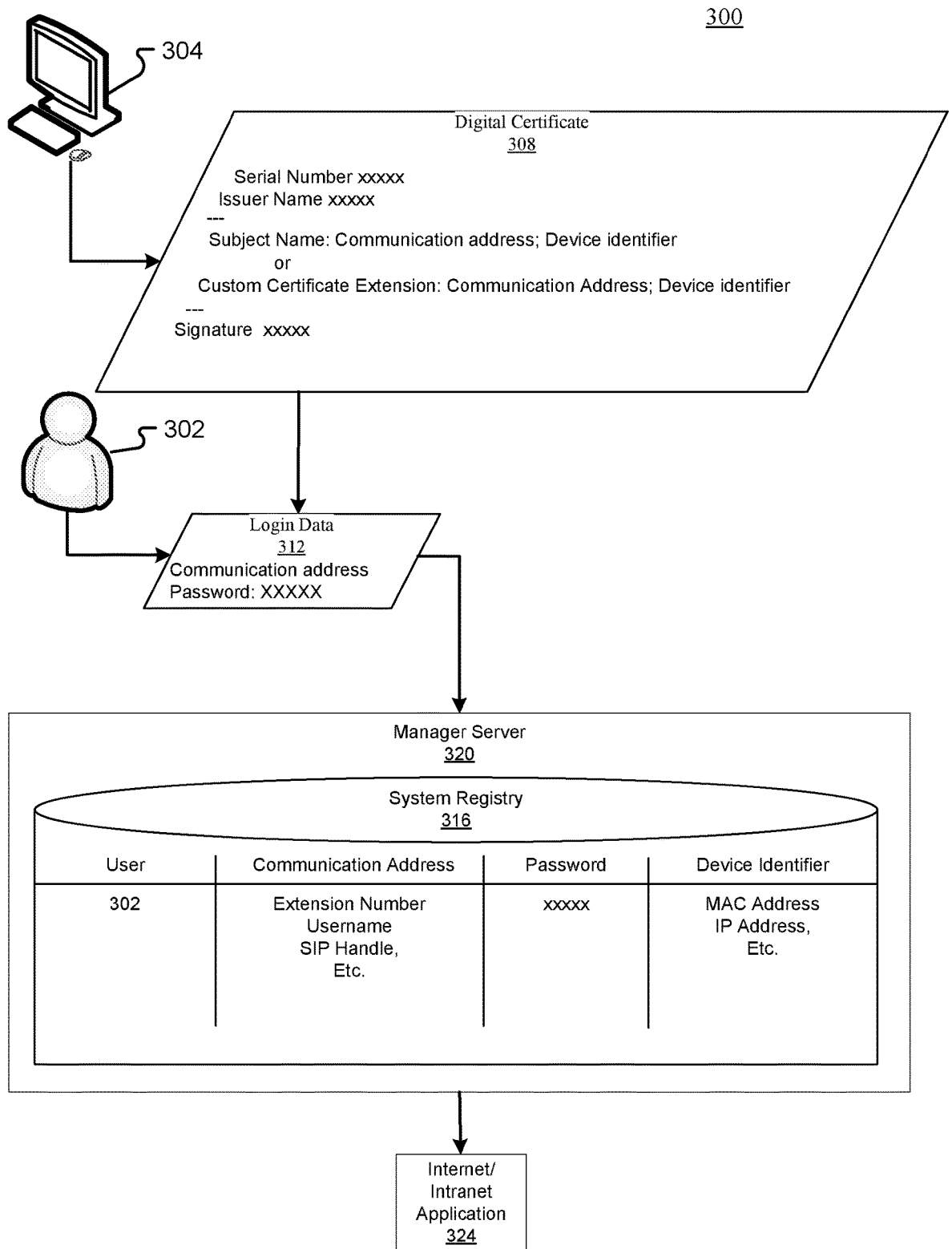
FIG. 3 is a block diagram depicting a user being authenticated to a communication system where a communication address is tied to a communication device according to embodiments of the present disclosure.

FIG. 3 is a block diagram depicting a user 302 being authenticated to a communication system 300 where a communication address is tied to a communication device 304 according to embodiments of the present disclosure. As illustrated in FIG. 3, the communication system 300 may include a certificate 308 issued to the communication device 304. Also included in the communication system 300 is a manager server 320 having provided therein a system registry 316 including registered information at least for user 302. The registered information for user 302 includes a communication address (e.g., an extension number, a username, a SIP handle, etc.) a password, and a device identifier for the communication device 304 (e.g., a MAC address, an IP address, etc.) In order to make a phone call from communication device 304 using internet/intranet application 324, user 302 provides login data 312. According to one embodiment of the present disclosure, the login data 312 includes a communication address (e.g., an extension number, a username, a SIP handle, etc.) and a password. The entered communication address and password are encrypted using the digital certificate 308. The digital certificate 308 includes, among other things, a subject name which includes the communication device name, the device identifier (e.g., the MAC address) and the communication address. As stated above, the device identifier and the communication address constitute tying information. As illustrated in FIG. 3, the communication address and the device identifier (i.e., the tying information) may also be included in a custom certificate extension.

The encrypted information is sent to the manager server 320 for decryption. The decrypted information is compared with the registered information stored in the system registry 316. A login is only successful if the decrypted information matches the registered information. Therefore, a login is only successful if the communication address provided in the digital certificate 308 and entered into the communication device 304 matches the communication address provided in the registered information. The device identifier provided in the digital certificate 308 must also match the device identifier provided in the registered information meaning the call is made from the communication device 304 associated with the device identifier. Also, the password provided in the registered information must match the entered password.

Figure 4:
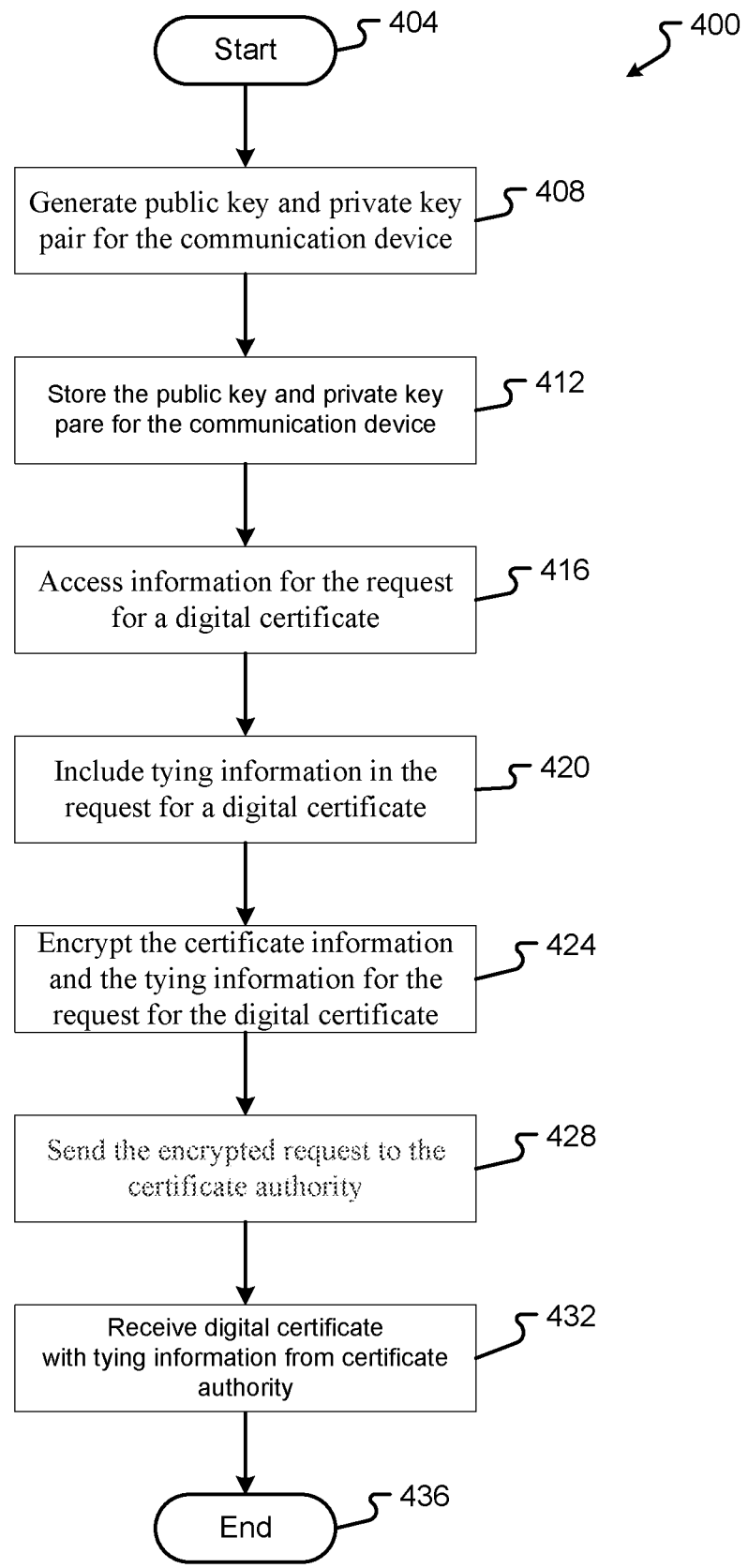
FIG. 4 is a flow diagram depicting a method for creating a request for a digital certificate in accordance with embodiments of the present disclosure.

FIG. 4 is a flow diagram depicting a method 400 for creating a request for a digital certificate in accordance with embodiments of the present disclosure. While a general order of the steps of method 400 is shown in FIG. 4, method 400 can include more or fewer steps or can arrange the order of the step differently than those shown in FIG. 4. Further, two or more steps may be combined in one step. Generally, the method 400 starts at START operation at step 404 and ends with an END operation at step 436. The method 400 can be executed as a set of computer-executable instructions (e.g., communication instructions, etc.) executed by a computer system (e.g., the manager server 120, the communication device(s) 104, the processor 128, etc.) and encoded or stored on a computer readable medium (e.g., memory 132, etc.). Hereinafter, the method 400 shall be explained with reference to the systems, components, modules, applications, software, data structures, user interfaces, etc. described in conjunction with FIGS. 1-3, 6A and 6B.

Method 400 begins at step 404 and proceeds to step 408, where the processor of the communication device 104 generates a public key and private key for the communication device's public and private key pair. According to embodiments of the present disclosure, the public key and private key are generated using a random number generator for example. The random number generator is preferably a random source or a cryptographically secure pseudo-random-bit generator. Example random number generators may include, but are not limited to linear congruential generators, Feedback Shift Register (FSR)s (e.g., linear and nonlinear FSRs, feedback carry shift registers, etc.), A5 algorithm, Hughes XPD/KPD algorithm, Nanoteq algorithm, Rambutan algorithm, additive generators, Gifford stream cipher, Algorithm M, PDZIP algorithm, RC4 algorithm, SEAL algorithm, WAKE algorithm, RAND tables, random noise generators, and the like.

After the processor of the communication device 104 generates a public key and private key for the communication device's public and private key pair at step 408, method 400 proceeds to step 412 where the processor of the communication device 104, stores the public key and private key of the communication device 104 in a memory device associated with the communication device 104. After the processor of the communication device 104 stores the public key and private key of the communication device 104 in a memory associated with the communication device 104 at step 412, method 400 proceeds to step 416 where the processor of the communication device 104 accesses certificate information for the request for a digital certificate. The certificate information includes identifying information such as, but not limited to the device or user covered by the certificate (e.g., the information identified in the subject field). According to embodiments of the present disclosure, the identifying information for a communication device 104 includes a common name for the communication device 104. Also a device identifier, such as a MAC address is included to identify the communication device 104. As defined herein, the MAC address is the physical address which uniquely identifies each device on a given network.

Other certificate information included with the request for the digital certificate include the legal name of the organization to which the device or user belongs, the organizational unit of the device or user that handles the certificate, the city where the organization is located, the state or region where the organization is located, the country where the organization is located, an email address used to contact the organization and a copy of the public key that will go into the digital certificate.

After accessing the certificate information for the request for the digital certificate at step 416, method 400 proceeds to step 420, where the processor of the communication device 104 includes the tying information in the request for the digital certificate. The tying information ties the communication device 104 with a communication address. For example, the communication address may include, for example, an extension, a username, a SIP handle etc. Other communication addresses include the addresses provided in the Table discussed above.

Figure 6A:
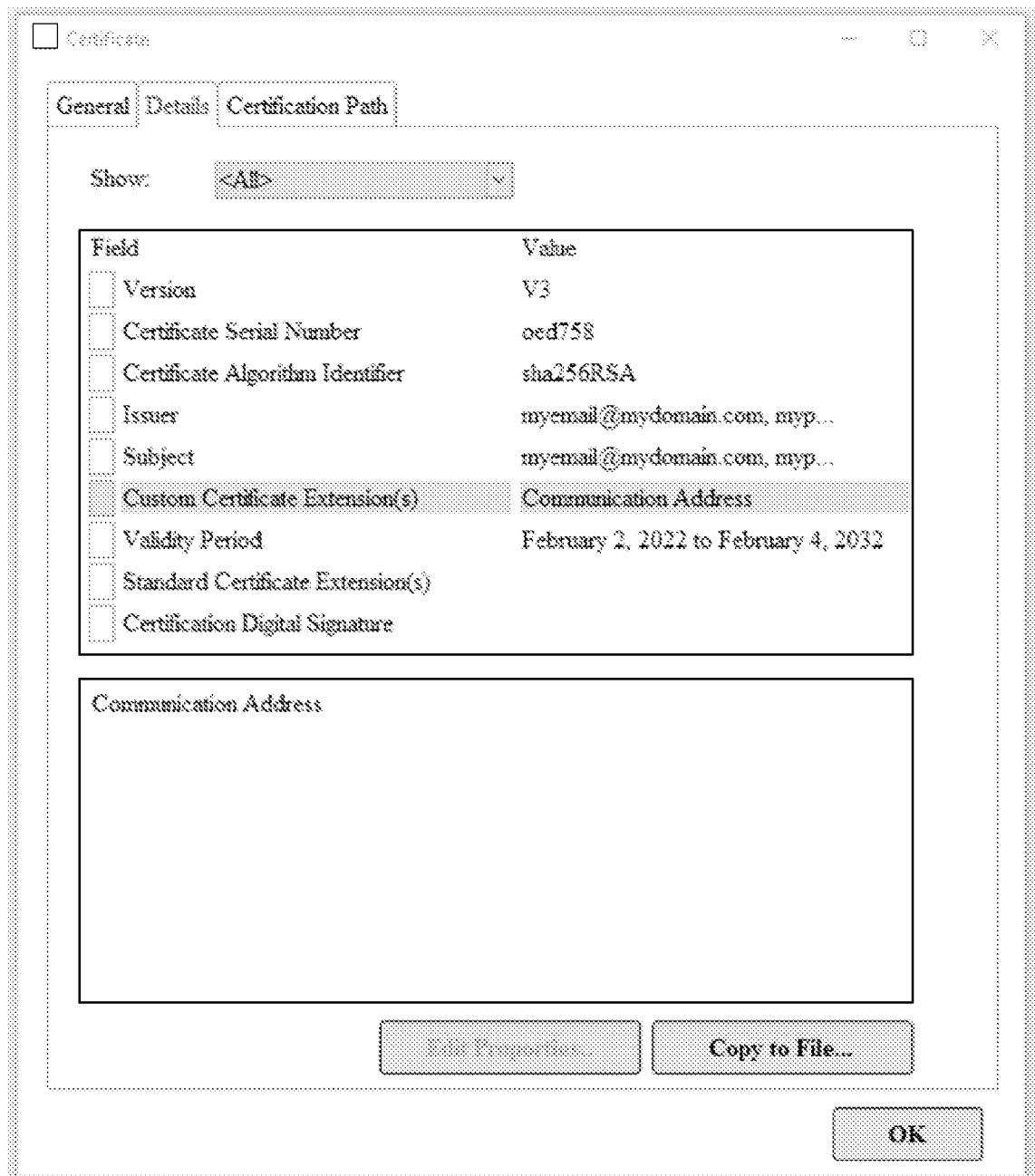
FIG. 6A is a block diagram illustrating features found within a digital certificate according to one embodiment of the present disclosure.

FIG. 6A is a block diagram illustrating features found within a digital certificate 600 according to one embodiment of the present disclosure. As illustrated in FIG. 6A, the digital certificate 600 includes various fields such as, but not limited to, a version field, a certificate serial number field, a certificate algorithm identifier field, an issuer field, a subject field, a custom certificate extension field, a validity period field, a standard certificate extension(s) field and a certificate digital signature field. Values for the various fields are also included on the left-hand side column of the digital certificate 600. For example, the value for the version field is "V3". The value for the certificate serial number field is "oed758". The value for the certificate algorithm identifier field is "sha256RSA". The value for the issuer field is myemail@mydomain.com along with other information not readily displayed. The value for the validity period field is "Feb. 2, 2022 to Feb. 4, 2032". The value for the subject field is myemail@mydomain.com along with other information including the device identifier (e.g., the MAC address) not readily displayed. A custom certificate extension field is provided as a separate field for the digital certificate. As illustrated in FIG. 6A, the value for the custom certificate extension field is shown in the expanded view at the bottom window of the digital certificate 600 when the custom certificate extension field is highlighted. The device identifier and the communication address constitute the tying information.

Figure 6B:
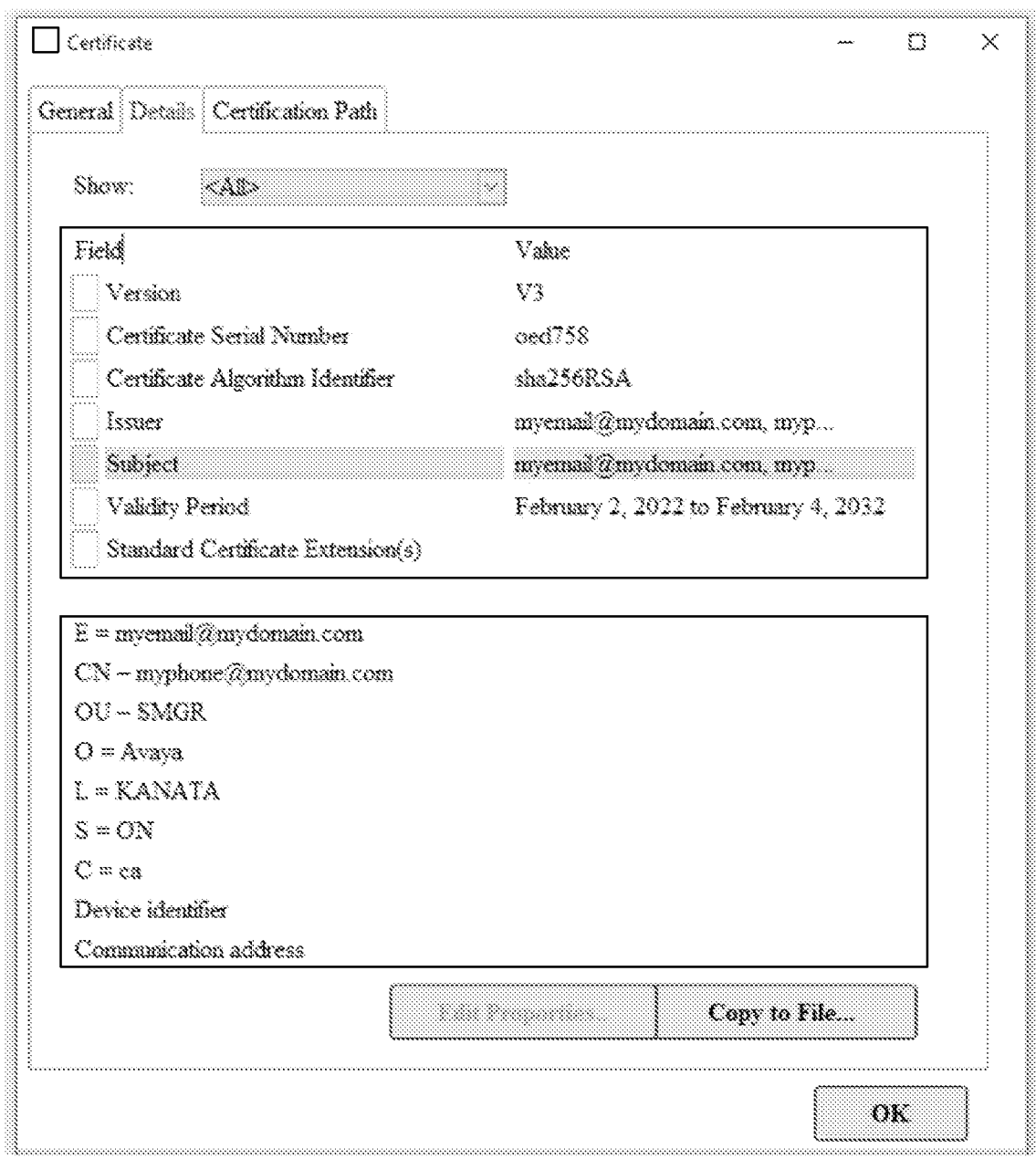
FIG. 6B is a block diagram illustrating features found within a digital certificate according to an alternative embodiment of the present disclosure.

FIG. 6B is a block diagram illustrating features found within a digital certificate 650 according to an alternative embodiment of the present disclosure. As illustrated in FIG. 6B, the digital certificate 650 includes various fields such as, but not limited to, a version field, a certificate serial number field, a certificate algorithm identifier field, an issuer field, a subject field, a custom certificate extension(s) field, a validity period field, a standard certificate extension(s) field and a certificate digital signature field. Values for the various fields are also included on the left-hand side column of the digital certificate 650. For example, the value for the version field is "V3". The value for the certificate serial number field is "oed758". The value for the certificate algorithm identifier field is "sha256RSA". The value for the issuer field is myemail@mydomain.com along with other information not readily displayed. The value for the validity period field is "Feb. 2, 2022 to Feb. 4, 2032". The values for the subject field include the following information provided in an expanded view at the bottom window of the digital certificate 650: email address (E) myemail@mydomain.com; common name (CN) myphone@mydomain.com; organizational unit (OU) SMRG; organization (O) Avaya; locality (L) KANATA; state (S) ON; country (C) ca; and the device identifier (e.g., the MAC address). The communication address is included as another value in the subject field. For example, the communication address may include, for example, an extension number, a username, etc. The device identifier and the communication address constitute the tying information.

Referring back to FIG. 4, after the tying information has been included in the request for the digital certificate at step 420, method 400 proceeds to step 424 where the processor of the communication device 104, using an encryption algorithm, uses the public key to encrypt the certificate information and the tying information for the request for the digital certificate. Any encryption algorithm can be used. Examples of suitable encryption algorithms include, but are not limited to, AES, Federal Information Protocol Standard 197, DES, three DES, RC4, Rivest Shamir and Adelman (RSA), Diffie-Hellman, Digital Signal Algorithm or DSA, Lucifer, Madryga, NewDES, FEAL, REDOC, LOKI, Khufu and Khafre, RC2, IDEA, MMB, CA-1.1, Skipjack, GOST, CAST, Blowfish, SAFER, 3-Way, Crab, SXAL8/MBAL, RC5, knapsack algorithms, Pohlig-Hellman, Rabin, ElGamal, McEliece, Elliptic Curve Cryptosystems, LUC, finite automation public-key cryptosystems, DSA variants, discrete logarithm signature schemes, Ong-Schnorr-Shamir, ESIGN, cellular automata, and the like.

After encrypting the certificate information and the tying information for the request for the digital certificate at step 424, method 400 proceeds to step 428, where the processor of the communication device 104 sends the request for the digital certificate to the certificate authority server 170. After sending the request for the digital certificate to the certificate authority server 170 for processing at step 428, method 400 proceeds to step 432 where the processor of the communication device 104 receives the digital certificate with the tying information from the certificate authority server 170. After receiving the digital certificate with the tying information from the certificate authority server 170 at step 432, method 400 ends at END operation at step 436. According to one embodiment of the present disclosure, the tying information can be added to the database 160 before applying for the digital certificate which includes the tying information. According to an alternative embodiment of the present disclosure, the tying information can be added to the database 160 after receiving the digital certificate which includes the tying information.

Figure 5:
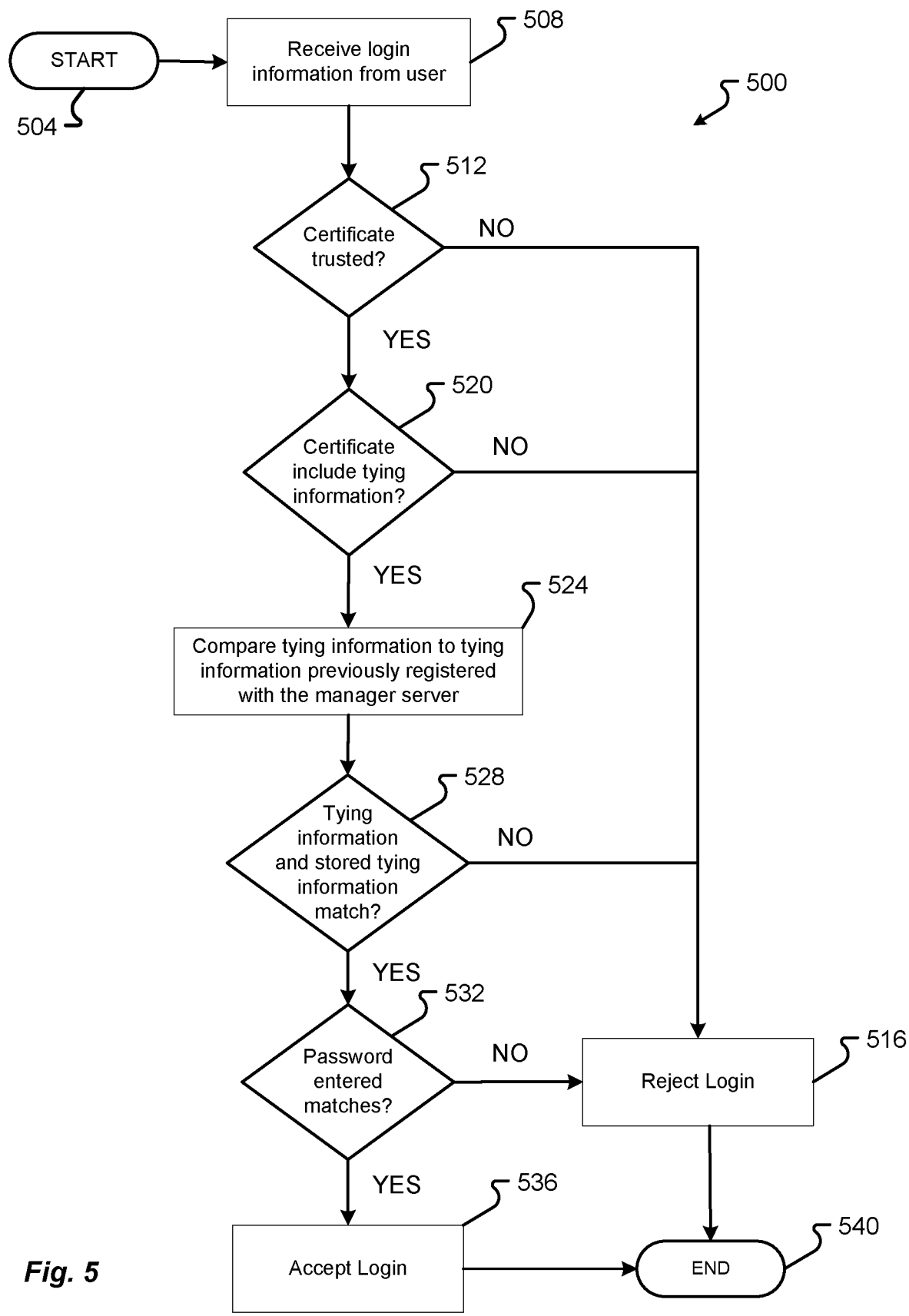
FIG. 5 is a flow diagram depicting a method for login to a communication device tied to a communication address in accordance with embodiments of the present disclosure.

FIG. 5 is a flow diagram depicting a method 500 for login to a communication device tied to a communication address in accordance with embodiments of the present disclosure. While a general order of the steps of method 500 is shown in FIG. 5, method 500 can include more or fewer steps or can arrange the order of the step differently than those shown in FIG. 5. Further, two or more steps may be combined in one step. Generally, the method 500 starts at START operation at step 504 and ends with an END operation at step 540. The method 500 can be executed as a set of computer-executable instructions (e.g., communication instructions, etc.) executed by a computer system (e.g., the manager server 120, the processor 128, etc.) and encoded or stored on a computer readable medium (e.g., the memory 132, etc.). Hereinafter, the method 500 shall be explained with reference to the systems, components, modules, applications, software, data structures, user interfaces, etc. described in conjunction with FIGS. 1-3, 6A and 6B.

Method 500 begins at step 504 and proceeds to step 508, where the processor 128 of the manager server 120 receives login information from a user 102 which is encrypted using the digital certificate including the tying information. According to embodiments of the present disclosure, the login information generally includes a communication address and a password.

After the processor 128 of the manager server 120 receives the login information from the user at step 508, method 500 proceeds to decision step 512 where the processor 128 of the manager server 120 determines if the digital certificate presented by the communication device 104 is trusted. The processor 128 of the manager server 120 determines if the digital certificate is trusted by checking the signature of the certificate authority.

If the processor 128 of the manager server 120 determines that the digital certificate presented by the communication device 104 is not trusted (NO) at decision step 512, method 500 proceeds to step 516, where the processor 128 of the manager server 120 rejects the login. After rejecting the login at step 516, method 500 ends with END operation at step 540.

If the processor 128 of the manager server 120 determines that the digital certificate presented by the communication device 104 is trusted (YES) at decision step 512, method 500 proceeds to decision step 520, where the processor 128 of the manager server 120 determines if the digital certificate includes tying information. According to one embodiment of the present disclosure, tying information may include information that ties a communication address to a particular communication device. If there is no tying information in the digital certificate (NO) at decision step 520, method 500 proceeds to step 516, where the processor 128 of the manager server 120 rejects the login. After rejecting the login at step 516, method 500 ends with END operation at step 540.

If the processor 128 of the manager server 120 determines that the digital certificate includes tying information (YES) at decision step 520, method 500 proceeds to step 524, where the processor 128 of the manager server 120 compares the tying information with the stored user information including the password, the communication address and the communication device (e.g., the device identifier) stored in the database 160. After comparing the tying information with the stored user information (e.g., the communication address and the device identifier) at step 524, method 500 proceeds to decision step 528, where the processor 128 of the manager server 120 determines if the tying information matches the stored tying information. If the tying information does not match the stored tying information (NO) at decision step 528, method 500 proceeds to step 516, where the processor 128 of the manager server 120 rejects the login. After rejecting the login at step 516, method 500 ends with END operation at step 540.

If the tying information matches the stored tying information (YES) at decision step 528, method 500 proceeds to decision step 532, where the processor 128 of the manager server 120 determines if the entered password is correct. If the entered password is not correct (NO) at decision step 532, method 500 proceeds to step 516, where the processor 128 of the manager server 120 rejects the login. After rejecting the login at step 516, method 500 ends with END operation at step 540. Although not illustrated, user 102 may be given a predetermined number of times to correctly login with the correct password.

If the entered password is correct (YES) at decision step 532, method 500 proceeds to step 536 where the processor 128 of the manager server 120 indicates that the login has been accepted. After the login has been accepted at step 536, the login process has been completed and method 500 ends at END operation at step 540. According to an alternative embodiment of the present disclosure, the above method can be applied to methods for making and receiving phone calls instead of a method for login.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on a programmed general-purpose computer with the cooperation of a controller and a memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, sub-combinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Methods described or claimed herein can be performed with traditional executable instruction sets that are finite and operate on a fixed set of inputs to provide one or more defined outputs. Alternatively, or additionally, methods described or claimed herein can be performed using AI, machine learning, neural networks, or the like. In other words, a system or server is contemplated to include finite instruction sets and/or artificial intelligence-based models/neural networks to perform some or all of the steps described herein.

Embodiments of the present disclosure include a method including storing, by a database, user information including tying information and a password. The tying information includes a communication address and a device identifier that ties the communication address to a communication device. The method also includes receiving, by a processor, the communication address and the password encrypted with a digital certificate associated with the communication device. The digital certificate includes the tying information. The method further includes comparing, by the processor, the tying information of the digital certificate and the stored tying information, determining, by the processor, that the tying information of the digital certificate matches the stored tying information, comparing, by the processor, the encrypted password with the stored password, determining, by the processor, the encrypted password matches the stored password and authenticating, by the processor, the user information for the communication device.

Aspects of the above method include wherein the user information is used to login.

Aspects of the above method include wherein the user information is used for making and receiving calls.

Aspects of the above method include wherein the communication address includes at least one of an extension number, a username, or a Session Initiation Protocol (SIP) handle.

Aspects of the above method include wherein the device identifier includes at least one of a Media Access Control (MAC) address or an Internet Protocol (IP) address.

Aspects of the above method include wherein the communication address is included as a value in the subject field of the digital certificate.

Aspects of the above method include wherein the communication address is included as a value in a custom certificate extension field of the digital certificate.

Aspects of the above method further include verifying, by the processor, an authenticity of the digital certificate associated with the communication device.

Aspects of the above method include wherein when the tying information from the digital certificate and the stored tying information do not match, the user information for the communication device is not authenticated.

Aspects of the above method include wherein when the encrypted password from the digital certificate and the stored password do not match, the user information for the communication device is not authenticated.

Embodiments of the present disclosure include a system for authentication including a memory and at least one processor, coupled to the memory, operative to store user information including tying information and a password. The tying information includes a communication address and a device identifier that ties the communication address to a communication device. The at least one processor is also operative to receive the communication address and the password encrypted with a digital certificate associated with the communication device. The digital certificate includes the tying information. The at least one processor is further operative to compare the tying information of the digital certificate and the stored tying information, determine that the tying information of the digital certificate matches the stored tying information, compare the encrypted password with the stored password, determine the encrypted password matches the stored password and authenticate the user information for the communication device.

Aspects of the above system include wherein the user information is used to login.

Aspects of the above system include wherein the user information is used for making and receiving calls.

Aspects of the above system include wherein the communication address includes at least one of an extension number, a username, or a Session Initiation Protocol (SIP) handle.

Aspects of the above system include wherein the device identifier includes at least one of a Media Access Control (MAC) address or an Internet Protocol (IP) address.

Embodiments of the present disclosure include a computer-readable storage device having instructions stored thereon that, in response to execution, cause a processor to authenticate user information including storing user information including tying information and a password, wherein the tying information includes a communication address and a device identifier that ties the communication address to a communication device and receiving the communication address and the password encrypted with a digital certificate associated with the communication device, wherein the digital certificate includes the tying information. The processor is further caused to authenticate the user information by comparing the tying information of the digital certificate and the stored tying information, determining that the tying information of the digital certificate matches the stored tying information, comparing the encrypted password with the stored password, determining the encrypted password matches the stored password and authenticating the user information for the communication device.

Aspects of the above computer-readable storage device include wherein the user information is used to login.

Aspects of the above computer-readable storage device include wherein the user information is used for making and receiving calls.

Aspects of the above computer-readable storage device include wherein the communication address includes at least one of an extension number, a username or a Session Initiation Protocol (SIP) handle.

Aspects of the above computer-readable storage device include wherein the device identifier includes at least one of a Media Access Control (MAC) address or an Internet Protocol (IP) address.

What is claimed is:

1. A method, comprising:
storing, by a database, user information including tying information and a password,
wherein the tying information includes a communication address and a device identifier that ties the communication address to a communication device and the communication address includes at least one of an extension number or a Session Initiation Protocol (SIP) handle;
receiving, by a processor, the communication address and the password encrypted with a digital certificate associated with the communication device,
wherein the digital certificate includes the tying information;
decrypting, by the processor, the encrypted communication address and password,
determining, by the processor, whether the digital certificate is trusted;
when the digital certificate is deemed trusted, comparing, by the processor, the tying information of the digital certificate and the stored tying information;
determining, by the processor, that the tying information of the digital certificate matches the stored tying information;
comparing, by the processor, the password with the stored password;
determining, by the processor, the password matches the stored password; and
authenticating, by the processor, the user information for the communication device within a SIP environment.

2. The method according to claim 1, wherein the user information is used to login.

3. The method according to claim 1, wherein the user information is used for making and receiving calls.

4. The method according to claim 1, wherein the device identifier includes at least one of a Media Access Control (MAC) address or an Internet Protocol (IP) address.

5. The method according to claim 1, wherein the communication address is included as a value in a subject field of the digital certificate.

6. The method according to claim 1, wherein the communication address is included as a value in a custom certificate extension field of the digital certificate.

7. The method according to claim 1, further comprising verifying, by the processor, an authenticity of the digital certificate associated with the communication device.

8. The method according to claim 1, wherein when the tying information from the digital certificate and the stored tying information do not match, the user information for the communication device is not authenticated.

9. The method according to claim 1, wherein when the password from the digital certificate and the stored password do not match, the user information for the communication device is not authenticated.

10. A system for authentication, comprising:
a memory; and
at least one processor, coupled to the memory, operative to:
store user information including tying information and a password,
wherein the tying information includes a communication address and a device identifier that ties the communication address to a communication device and the communication address includes at least one of an extension number or a Session Initiation Protocol (SIP) handle;
receive the communication address and the password encrypted with a digital certificate associated with the communication device,
wherein the digital certificate includes the tying information;
decrypt the encrypted communication address and password,
determine whether the digital certificate is trusted;
when the digital certificate is deemed trusted, compare the tying information of the digital certificate and the stored tying information;
determine that the tying information of the digital certificate matches the stored tying information;
compare the password with the stored password;
determine the password matches the stored password; and
authenticate the user information for the communication device within a SIP environment.

11. The system according to claim 10, wherein the user information is used to login.

12. The system according to claim 10, wherein the user information is used for making and receiving calls.

13. The system according to claim 10, wherein the device identifier includes at least one of a Media Access Control (MAC) address or an Internet Protocol (IP) address.

14. A computer-readable storage device having instructions stored thereon that, in response to execution, cause a processor to authenticate information, comprising:
storing user information including tying information and a password,
wherein the tying information includes a communication address and a device identifier that ties the communication address to a communication device and the communication address includes at least one of an extension number or a Session Initiation Protocol (SIP) handle;
receiving the communication address and the password encrypted with a digital certificate associated with the communication device,
wherein the digital certificate includes the tying information;
decrypting the encrypted communication address and password;
determining whether the digital certificate is trusted by checking a signature of a certificate authority;
when the digital certificate is deemed trusted, comparing the tying information of the digital certificate and the stored tying information;
determining that the tying information of the digital certificate matches the stored tying information;
comparing the password with the stored password;
determining the password matches the stored password; and
authenticating the user information for the communication device within a SIP environment.

15. The computer-readable storage device according to claim 14, wherein the user information is used to login.

16. The computer-readable storage device according to claim 14, wherein the user information is used for making and receiving calls.

17. The computer-readable storage device according to claim 14, wherein the device identifier includes at least one of a Media Access Control (MAC) address or an Internet Protocol (IP) address.

18. The computer-readable storage device according to claim 14, wherein when the password from the digital certificate and the stored password do not match, the user information for the communication device is not authenticated.

19. The system according to claim 10, wherein when the tying information from the digital certificate and the stored tying information do not match, the user information for the communication device is not authenticated.

20. The system according to claim 10, wherein when the password from the digital certificate and the stored password do not match, the user information for the communication device is not authenticated.

* * * * *